United States Patent
Ikeda (10) Patent No.: US 8,196,713 B2
(45) Date of Patent: Jun. 12, 2012

(54) MECHANICAL TYPE BRAKE ACTUATOR FOR DRUM BRAKE

(75) Inventor: Takashi Ikeda, Toyota (JP)

(73) Assignee: Nisshinbo Holdings, Inc., Tokyo (JP)

( * ) Notice: Subject to any disclaimer, the term of this patent is extended or adjusted under 35 U.S.C. 154(b) by 427 days.

(21) Appl. No.: 12/638,801

(22) Filed: Dec. 15, 2009

(65) Prior Publication Data

US 2010/0147638 A1 Jun. 17, 2010

(30) Foreign Application Priority Data

Dec. 16, 2008 (JP) .................................. 2008-319554
Dec. 2, 2009 (JP) .................................. 2009-274421

(51) Int. Cl.
*F16D 65/14* (2006.01)

(52) U.S. Cl. .................................. 188/2 D; 188/106 A (58) Field of Classification Search .................. 188/2 D, 188/106 A, 106 F, 106 P, 74, 78, 79.57, 325, 188/331; 74/502.6, 500.5, 502.4
See application file for complete search history.

(56) References Cited

U.S. PATENT DOCUMENTS

2007/0158149 A1 7/2007 Ikeda

FOREIGN PATENT DOCUMENTS

| JP | 2001165141 | * | 6/2001 |
| JP | 2001-349360 A | | 12/2001 |
| JP | 2001349360 A | | 12/2001 |
| JP | 2004-293643 A | | 10/2004 |
| JP | 2004293643 A | | 10/2004 |
| JP | 2007-187195 A | | 7/2007 |

* cited by examiner

*Primary Examiner* — Xuan Lan Nguyen
(74) *Attorney, Agent, or Firm* — Apex Juris, PLLC; Tracy M. Heims (57) ABSTRACT

To provide the mechanical type brake actuator for a drum brake that can reduce the number of operational steps and that assures the brake cable connection accuracy. In the mechanical type brake actuator having a strut engaging with one brake shoe and a plate-like brake lever engaging with the other brake shoe, a retaining member having a tongue is mounted in a portion of the strut so that the retaining member resiliently deforms toward a free end of the brake lever, and when the retaining member is resiliently deformed, a connecting-pin is capable of penetrating a by-pass hole of the retaining member to connect a brake cable and the free end of the brake lever, and the connecting-pin movement is restricted after releasing a resilient deformation of the retaining member after connecting the brake cable and the brake lever.

6 Claims, 12 Drawing Sheets

MECHANICAL TYPE BRAKE ACTUATOR FOR DRUM BRAKE

CROSS-REFERENCE TO RELATED APPLICATION(S) AND CLAIM OF PRIORITY

The present application claims the benefit under 35 U.S.C. section 119(a) of Japanese Patent Applications filed in the Japan Patent Office on Dec. 16, 2008 and assigned serial number 2008-319554, and on Dec. 2, 2009 and assigned serial number 2009-274421, the disclosure of which is incorporated herein by reference.

FIELD OF INVENTION

This invention relates to a mechanical type brake actuator for a drum brake device.

BACKGROUND OF THE INVENTION

A conventional mechanical type brake actuator, which is used for a drum brake device, is comprised of, as main elements, a plate-like brake lever, a strut pivotally retaining the brake lever therein, and a pivot pin. The mechanical type brake actuator is positioned between a pair of brake shoes and the brake lever rotates relative to the strut with a pivot point therebetween as a fulcrum by pulling a brake cable connected to the brake lever so that a brake shoe engagement portion of the brake lever and a brake shoe engagement portion of the strut spread in an opposite direction to extend a distance therebetween, thereby operating the drum brake.

A conventional mechanical type brake actuator is so configured that a first connecting-hole, which is formed on the brake lever at a free end thereof positioned away from a pivoting portion (proximal portion) thereof, and a second connecting-hole, which is formed on a cable end fixed at an end of the brake cable, are aligned at a certain position where both connecting-holes are not obstructed with the strut at a cable releasing direction side, so that the connecting-pin can be inserted through both connecting-holes, thereby establishing the connection between the brake lever and the cable end. Thereafter, the brake cable is pulled, thus constantly positioning the connecting-pin within a space formed between a pair of facing plates to prevent disengagement of the connecting-pin from the brake lever.

Patent Document 1 (Japanese Unexamined Patent Publication No. 2001-349360) or Patent Document 2 (Japanese Unexamined Patent Publication No. 2004-293643) discloses one example of configurations where the connecting-pin is positioned within the space formed between the pair of facing plates to restrict the brake lever rotation in the cable releasing direction. These conventional inventions are technologies to prevent the connecting-pin from moving to a position where the connecting-pin can be disengaged from the brake lever by a clip that is attached on the strut. The brake lever and the brake cable are connected via the connecting-pin, and thereafter the clip is rotated to complete the connecting operation between the brake lever and the brake cable. After completion of the connecting operation between the brake lever and the brake cable, an attempt to rotate the brake lever in the cable releasing direction can be prevented because the clip restricts the brake lever rotation thereby preventing the disengagement of the connecting-pin from the brake lever. In addition, Patent Document 3 (Japanese Unexamined Patent Publication No. 2007-87195) discloses the invention that is a technology for restricting the connecting-pin movement. The present invention uses a clip with a by-pass hole to be installed on the strut to prevent the disengagement of the connecting-pin from the brake lever, and the connecting-pin is inserted through the by-pass hole of the clip, temporarily set on a first facing plate and the notched groove of the first facing plate, so that the brake lever and the brake cable are connected, and thereafter the clip is pressed with a thumb or a finger in a cable operating direction until a flat surface of the clip obstructs the notched groove of the first facing plate, thereby completing the connection between the brake lever and the brake cable. After completing the connecting operation, the invention is configured to prevent the disengagement of the connecting-pin from the brake lever by restricting the connecting-pin movement between the second facing plate without the notched groove and the flat surface of the clip.

[Patent Document 1] Japanese Unexamined Patent Publication No. 2001-349360
[Patent Document 2] Japanese Unexamined Patent Publication No. 2004-293643
[Patent Document 3] Japanese Unexamined Patent Publication No. 2007-187195

The above-described conventional mechanical type brake actuator has the following problems.

<1> In order to connect the cable end to the brake lever, there are at least two steps for an operator; the operator needs to manually insert the connecting-pin into both the connecting-holes of the brake lever and the cable end and; needs to move the clip thereafter, which increases operational time.

<2> Also, simply installing the connecting-pin does not restrict the connecting-pin movement as both the connecting-holes of the brake lever and the cable end are at the insertion position or, that is, the connecting-pin movement is free before moving the clip.

<3> In addition, the operator needs to manually move the clip, and therefore there is a possibility of operational error, such as inappropriate pin insertion or insufficient clip movement, which makes it difficult to assure an accurate brake cable connection.

Especially, there is a problem when transporting the drum brake device while the brake lever and brake cable are connected because the connecting-pin can be disengaged from the brake lever during transportation, thereby releasing the cable end connection.

SUMMARY OF THE INVENTION

The present invention is made in consideration of the above-described problems, and an object thereof is to provide a mechanical type brake actuator for a drum brake that requires less operational steps for the operator and further provides assurance of an accurate brake cable connection.

This invention is characterized in that the mechanical type brake actuator comprises (a) a strut to engage with one brake shoe, the strut having a pair of facing plates and a bridge connecting the facing plates; and (b) a plate-like brake lever to engage with an other brake shoe and retained in a space between the facing plates of the strut, the brake lever having a proximal portion pivotally supported by the strut, the brake lever and strut rotate relative to each other to spread apart from each other when a brake cable is pulled, the brake cable is connected to a free end of the brake lever via a connecting-pin, in which the mechanical type brake actuator further comprises a retaining member having a tongue with an by-pass hole through which the connecting-pin penetrates and being resiliently deformable toward the free end of the brake lever, only when rotating the brake lever in a cable releasing direction and resiliently deforming the retaining member toward the free end of the brake lever, the connecting-pin is capable of penetrating the by-pass hole of the retaining member to connect the brake cable and the free end of the brake lever, and the connecting-pin movement is restricted after releasing the resilient deformation of the retaining member after connecting the brake cable and the brake lever.

This invention is characterized in that in the mechanical type brake actuator as described above, while restricting a cable releasing directional rotation of the brake lever as abutting against the strut, when restricting the resilient deformation of the retaining member as abutting against the brake lever, the connecting-pin is capable of penetrating the by-pass hole of the retaining member so as to allow a connection between the brake cable and the free end of the brake lever.

This invention is characterized in that in the mechanical type brake actuator as described above, the strut is configured such that the facing plate at a brake lever side has a first stepped surface or an upper stepped surface which is near the brake lever and a second stepped surface or a lower stepped surface which is formed from the first stepped surface and away from the brake lever and the tongue of the retaining member moves on the second stepped surface and at the same time a brake lever side surface of the tongue is arranged to be in the same level with the first stepped surface of the strut, and a distance between a stepped portion at a border of the first stepped surface and the second stepped surface of the strut and an edge portion of the tongue of the retaining member facing the stepped portion is smaller than a diameter of the connecting-pin.

This invention is characterized in that in the mechanical type brake actuator as described above, the proximal end of the cable end is movable as abutting against a cable operation direction side of the free end of the brake lever, and during the movement, the connecting-pin is connectable to the cable end and the free end of the brake lever.

The present invention has at least one of the following advantages.

<1> The present invention requires only one operational step for connecting the brake lever and the brake cable by resiliently deforming the retaining member and simultaneously by inserting the connecting-pin into the connecting-holes of the brake lever and the cable end, which reduces the operation time compared to the conventional technology that requires two operational steps, i.e. a connection pin insertion step and a retaining member operation step.

Especially, the cable end is movable as abutting against the brake lever, and the connecting-pin can connect the brake cable and the brake lever while the cable end is moving. When the retaining portion is resiliently deformed, and the connecting-pin is temporarily set in the retaining member, the operator does not need to actually monitor the brake lever connecting-hole to align with the cable end connecting-hole, which further reduces the operation time.

<2> The connecting-pin is inserted while resiliently deforming the retaining member, and then, as releasing the resilient deformation of the retaining member, due to a resilient restoring force, the retaining member automatically springs back to an original position, thereby restricting the connecting-pin movement, and therefore no additional operations are required, such as moving the retaining member after inserting the connecting-pin, and this eliminates the possibility of operator error.

<3> When the strut is configured such that the facing plate at the brake lever side has a first stepped surface or an upper stepped surface which is near the brake lever, and a second stepped surface or a lower stepped surface which is away from the brake lever, the retaining member moves on the second stepped surface and at the same time a brake lever side surface of the retaining member is arranged to be in the same level with the first stepped surface, which downsizes the retaining member.

BRIEF DESCRIPTION OF THE DRAWINGS

The above and other objects of the present invention will become readily apparent by reference to the following detailed description when considered in conjunction with the accompanying drawings wherein.

DETAILED DESCRIPTION OF THE PREFERRED EMBODIMENT

The mechanical type brake actuator and the brake cable connecting method according to the present invention will be explained next with reference to the drawings.

Embodiment 1

Figure 1:
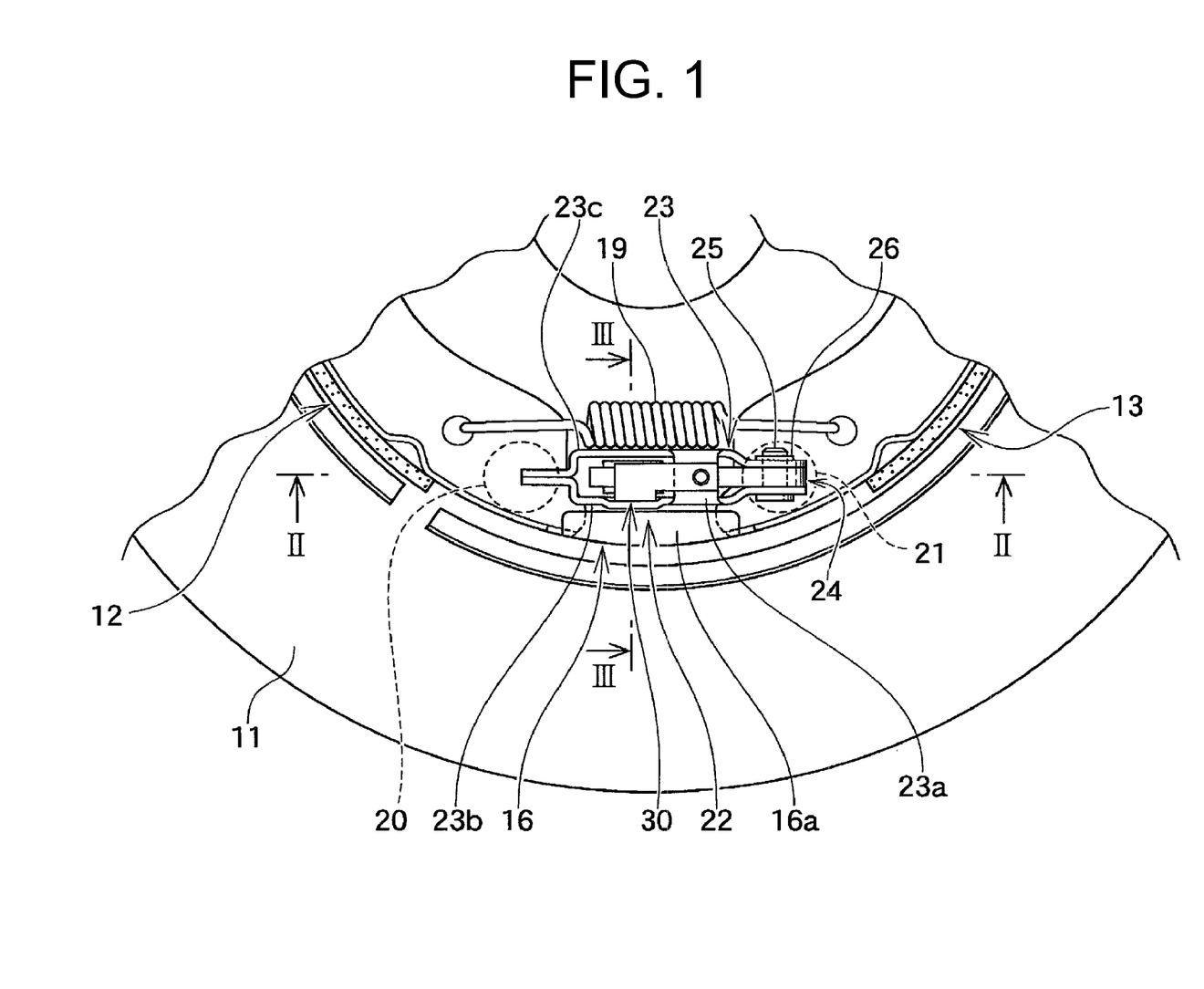
FIG. 1 is a plan view of one example of the drum brake device equipped with the mechanical type brake actuator according to the first embodiment.
Figure 2:
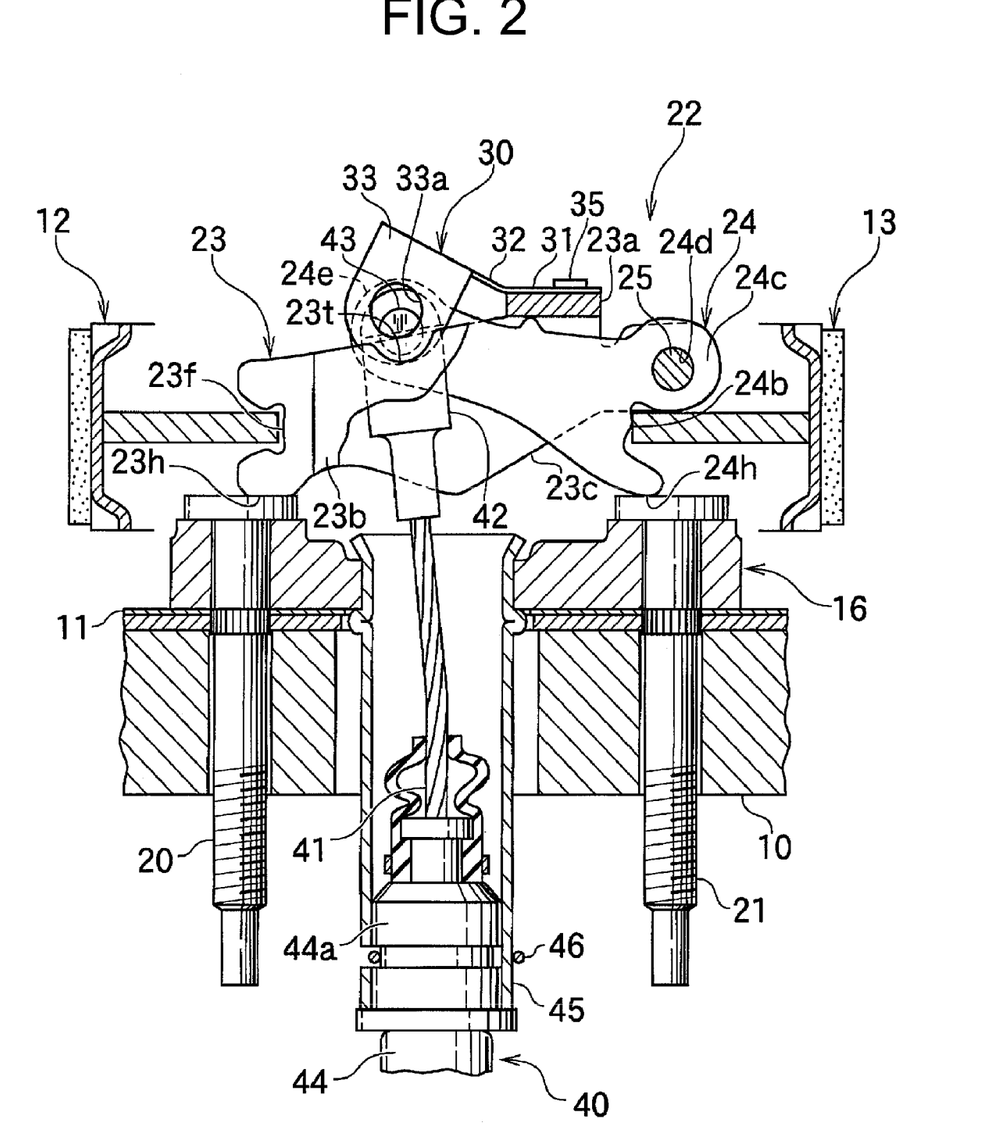
FIG. 2 is a cross section view of FIG. 1 taken along the line II-II.
Figure 3:
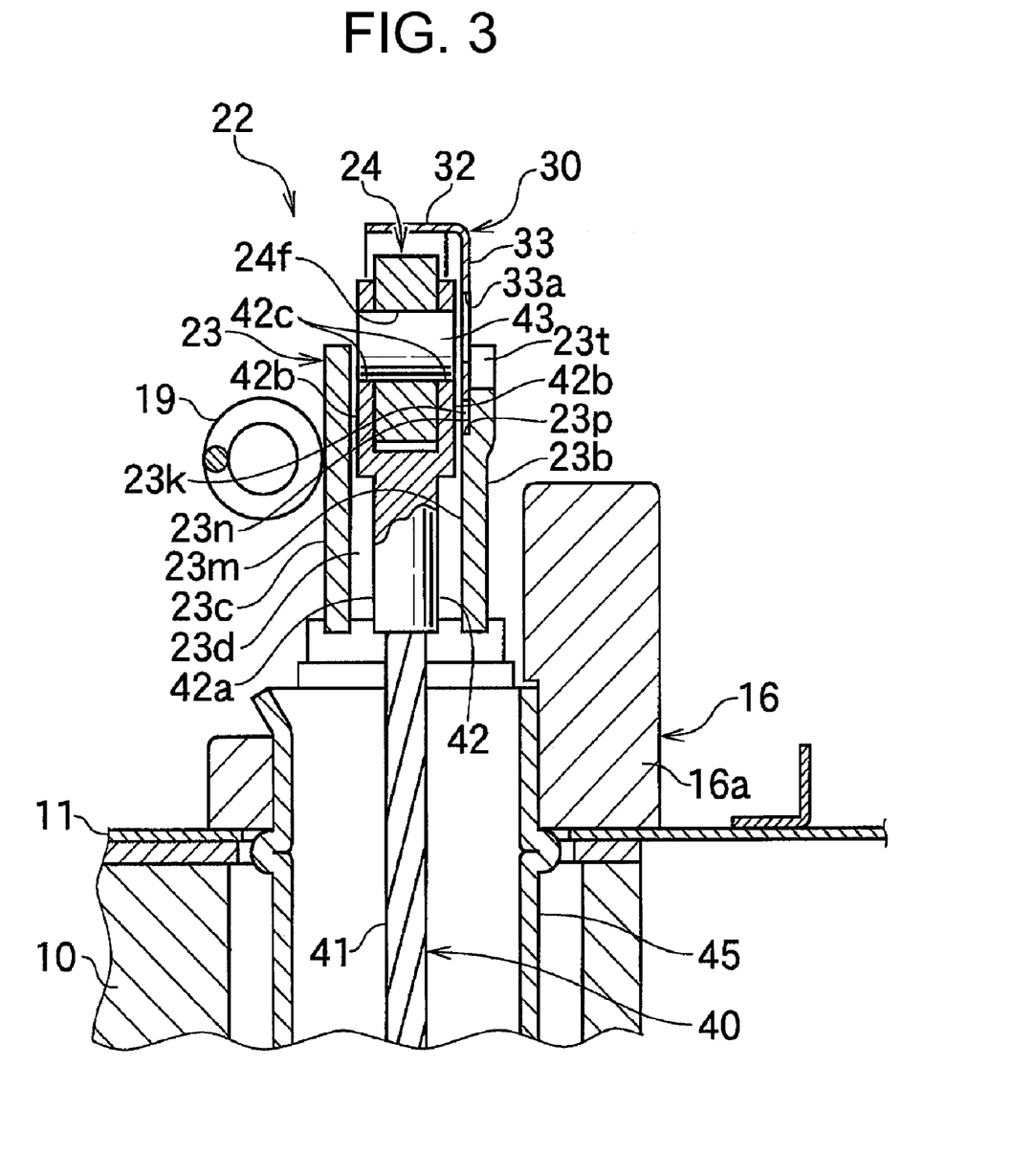
FIG. 3 is a cross section view of FIG. 1 taken along the line III-III.
Figure 4:
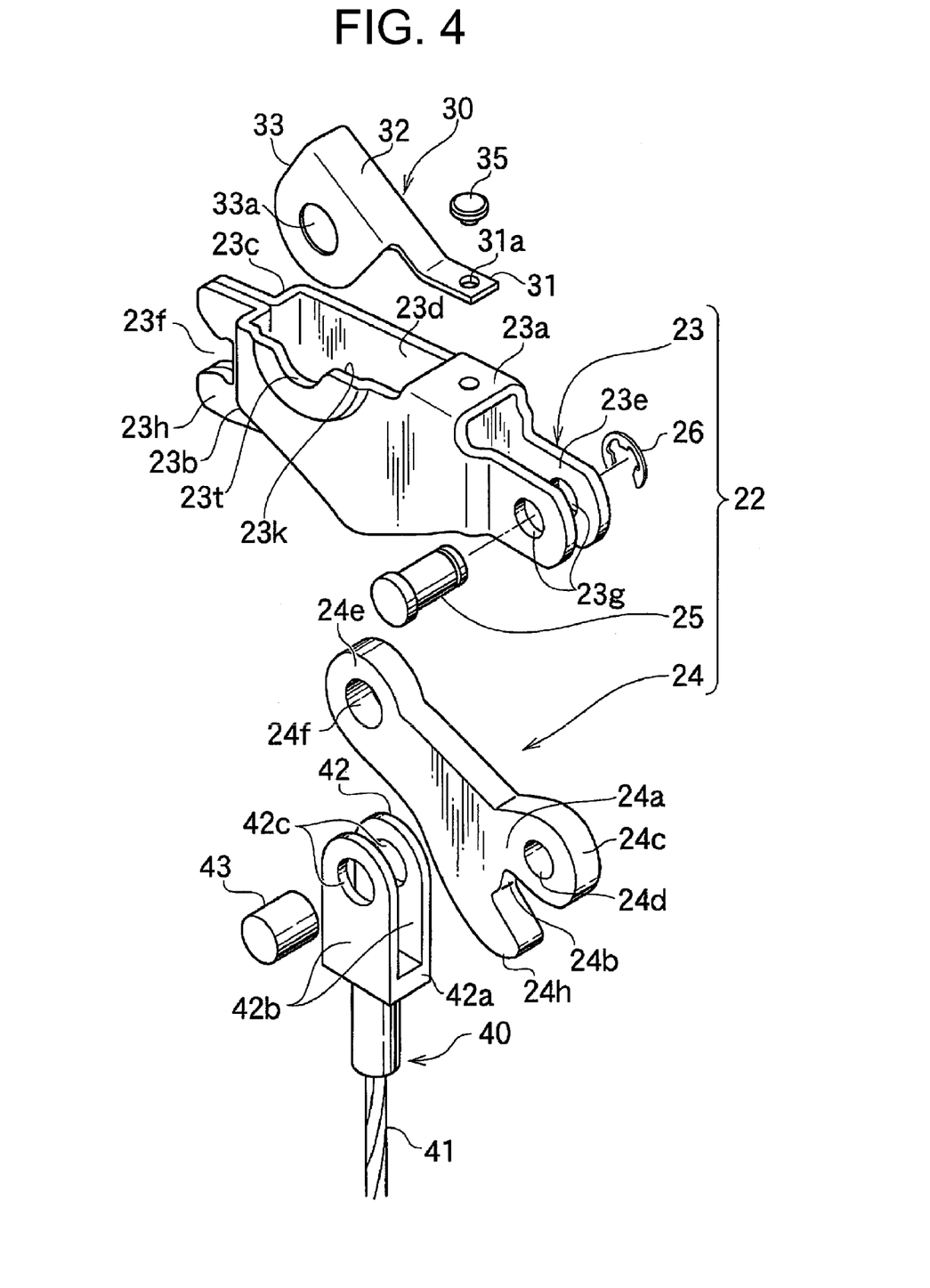
FIG. 4 is an exploded perspective view of the mechanical type brake actuator according to the first embodiment.
Figure 5:
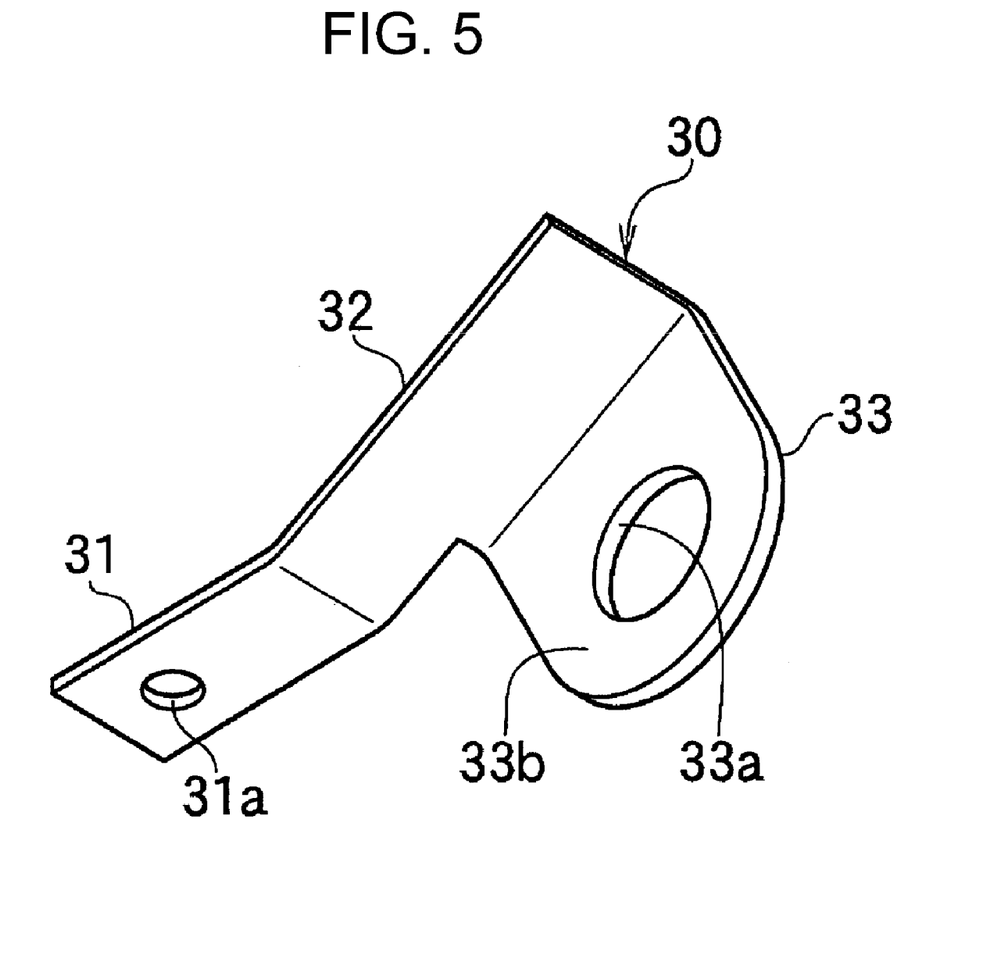
FIG. 5 is a perspective view of the retaining member according to the first embodiment.

A first embodiment of the present invention will be explained with reference to FIGS. 1-7. FIG. 1 shows a plan view of an example of a drum brake device equipped with a mechanical type brake actuator, FIGS. 2 and 3 are cross section views of FIG. 1, FIG. 4 is an exploded perspective view of the mechanical actuating mechanism, and FIG. 5 is a perspective view of a retaining member.

Referring to the figures, a structure of the first embodiment of the present invention will be explained.

A pair of brake shoes 12 and 13 are movably mounted, using a shoe-hold mechanism (not shown in the figures), on a back plate 11 that is fixed on a stationary portion 10 of a vehicle, and a pair of facing ends of the brake shoes 12 and 13 are supported at a raised portion 16a of a later described anchor 16 while a pair of the other facing ends (not shown in the figures) are connected via a connecting member (not shown in the figures). A pair of shoe return springs (only one shoe return spring 19 is shown herein) are extended between both brake shoes 12 and 13, which maintain abutment between one facing ends of the brake shoes 12, 13 and the anchor 16 and abutment between the other facing ends thereof and the connecting member.

A mechanical actuating mechanism 22 extending one facing ends of both brake shoes 12 and 13 is comprised of a strut 23, a brake lever 24, a pivot pin 25, and a stopper washer 26, and is inserted between both brake shoes 12 and 13 adjacent to the raised portion 16a of the anchor 16.

The strut 23, as a component of the mechanical actuating mechanism 22, is made of one plate-like member and has a C shaped bent section to form a pair of facing plates (a first facing plate 23 and a second facing plate 23c) and a bridge 23a positioned between both upper longitudinal ends of the facing plates.

Furthermore, one facing end portions of the pair of facing plates 23b and 23c are superposed to be welded for a cohesive attachment, a wide space (clearance) 23d is formed between both longitudinal ends thereof, and a narrow space narrower than the wide space 23e is formed at the other facing end portions.

A shoe-engagement groove 23f is formed on a superposing portion of the facing plates 23b and 23c while pivotal holes 23g, 23g are formed on the other side of the facing plates 23b and 23c. The bridge 23a, that extends between and connects the facing plates 23b and 23c at an upper section in FIG. 2, closes a portion of the wide space 23d and restricts the clockwise rotation of the brake lever 24 in FIG. 2.

Also, a notched groove 23t, allowing a later described connecting-pin 43 to pass through, is formed on an upper edge of the first facing plate 23b in FIG. 2.

The second facing plate 23c, while a portion of a top surface of the brake lever 24 in FIG. 2 abutting against the bridge 23a of the strut 23, when inserting the connecting-pin 43 into the connecting-holes 42c, 24f, 42c of a later described brake cable 40 and the brake lever 24, prevents the connecting-pin 43 to pass through the second facing plate 23c as a top of the connecting-pin 43 being stopped by abutting against the second facing plate 23c. The bridge 23a and both facing plates 23b and 23c, in relation to the brake lever 24, is configured such that the first facing plate 23b, while the brake lever 24 is abutting against the bridge 23a, allows the connecting-pin 43 to pass therethrough but the second facing plate 23c prevents the connecting-pin 43 from passing therethrough.

The brake lever 24, as a component of the mechanical actuating mechanism 22, is made of one plate-like member and is positioned within and sandwiched between the spaces 23d and 23e of the strut 23. A shoe-engagement groove 24b is formed on a proximal portion 24a of the brake lever 24. A pivot hole 24d, through which the pivot pin 25 is inserted, is formed on a second projection 24c that defines the shoe-engagement groove 24b. The stopper washer 26 is set on a top end of the pivot pin 25 inserted through the pivot holes 23g, 24d, and 23g of the strut 23 and the brake lever 24, and then the brake lever 24 is rotatably mounted relative to the strut 23. The brake lever 24 is restricted from clockwise rotation in FIG. 2 by abutting a portion of the upper surface thereof against the bridge 23a of the strut 23.

A free end 24e of the brake lever 24 has a connecting-hole 24f that can be used to connect a cable end 42, which is fixed on an end of an inner cable 41 as a component of the later described brake cable 40, to the brake lever 24 via the connecting-pin 43.

Also, the strut 23 and the brake lever 24, as components of the mechanical actuating mechanism 22, have a first projection 23h and a third projection 24h at a cable operating direction side, respectively, and the projections 23h and 24h are slidably abuttable against heads of bolts 20, 21, respectively.

The brake cable 40 is comprised of the inner cable 41 and an outer casing 44. The clevis-like cable end 42, which is fixed on the top of the inner cable 41, has a proximal portion 42a and a pair of forked legs 42b, 42b extending from the proximal portion 42a thereof. The connecting-holes 42c, 42c, through which the connecting-pin 43 is inserted, are formed on the forked legs 42b, 42b so as to be facing each other.

In the first embodiment, the cable end 42 of the brake cable 40 is designed to satisfy the following conditions. That is, while the brake lever 24 is abutting against the bridge 23a, when the cable end 42 moves in a direction of a top of the free end 24e as abutting the proximal portion 42a against the cable operating direction side of the free end 24e of the brake lever 24, the cable end 42 and the brake lever 24, are shaped to have a relation to align the cable connecting-hole 24f of the brake lever 24 and the connecting-hole 42c of the cable end 42 during the movement. See FIG. 6.

A retaining member 30, which is a member to prevent the connecting-pin 43 from disengaging from the brake lever, is fixed on a part of the strut 23.

This embodiment illustrates the retaining member 30, which is fixed on the bridge 23a.

As shown in FIGS. 4 and 5, the retaining member 30 of this embodiment is formed by bending an L-shaped thin flat spring steel plate and has a proximal portion 31 to be fixed on the bridge 23a of the strut 23, a spring strip 32 extending in one direction from the proximal portion 31, and a tongue 33 that is formed by bending the one side of the spring strip 32 in almost a right angle and has a by-pass hole 33a that is formed in the flat plate and is of sufficient size to allow the connecting-pin 43 to penetrate therethrough.

A means to fix the proximal portion 31 on the bridge 23a in this embodiment is accomplished by pressing a pin 35, that is penetrated through an installation hole 31a, formed in the proximal portion 31, into a hole formed in the bridge 23a; however, other conventional fixing means such as using an adhesive agent, tightening a screw, caulking with a protrusion formed on the bridge 23a, and other types of conventional fixing means may be used.

The spring strip 32 can be resiliently deformed in a direction toward the free end 24a of the brake lever 24 (in a rotational direction of the brake lever 24).

The retaining member 30 can be resiliently deformed by pushing the spring strip 32 in a cable operating direction so as to align the by-pass hole 33a of the tongue 33 to the notched groove 23t of the strut 23, and can close the notched groove 23t of the strut 23 so as to spring back the tongue 33 to an original position by releasing the resilient deformation by removing the pressure of the spring strip 32.

The retaining member 30 is configured to meet the following conditions as connecting the brake lever 24 to the brake cable 40. That is, while whole the connecting-hole 24f of the brake lever 24 is exposing from the first facing plate 23b, when the spring strip 32 is resiliently deformed until the retaining member 30 abuts against a retaining member-abutting member (the brake lever 24 in the first embodiment), the by-pass hole 33a formed on the tongue 33 is moved to align with the notched groove 23t formed on the first facing plate 23b of the strut 23 and the connecting-hole 24f formed on the brake lever 24. That is, in addition to above-described condition that the connecting-hole 42c, 42c is aligned with the connecting-hole 24f of the brake lever 24 are aligned, the connecting-pin 43 can pass through the connecting-holes 42c, 42c and 24f. As such, visual checking for positioning plural holes is not necessary by matching the maximum resilient deformation position of the retaining member 30 with a position to insert the connecting-pin 43.

Also, the retaining member 30 is configured to meet the following conditions when connecting the brake lever 24 to the brake cable 40. First, when removing the pressure on the spring strip 32 to release the resilient deformation thereof to spring back the tongue 33 to the original position, the connecting-pin 43 is designed to be positioned between the second facing plate 23c of the strut 23 and tongue 33 of the retaining member 30, thereby restricting the disengagement of the connecting-pin 43 from the brake lever 24.

Also, in the first embodiment, in order to minimize the size (length) of the tongue 33, an internal surface of the first facing plate 23b is designed to have a stepped space 23k comprised of a first surface (upper step) 23m, which is near the brake lever 24, a second surface (lower step) 23n, which is a stepped surface continuous from the first surface 23m and is slightly away from the brake lever 24, and a stepped portion 23p therebetween, and where the tongue 33 is positioned in the stepped space 23k. In order to maintain the abutment between the connecting-pin 43 and the tongue 33 of the retaining member 30, even when the brake lever 24 rotates, it is important to increase the size of the tongue 33 to a range for the brake lever 24 to move; however, the size of the tongue 33 can be reduced by positioning the tongue 33 in the stepped space 23k. At that time, the tongue 33 moves on the second surface 23n, and a back surface 33b of the tongue 33 at the brake lever 24 side is approximately leveled with the first surface 23m of the strut 23 a distance between a stepped portion 23p at a border of the first stepped surface 23m and the second stepped surface 23n of the strut 23 and an edge portion of the tongue 33 of the retaining portion 30 is smaller than a diameter of the connecting-pin 43, thereby creating smooth movement of the brake cable 40 with no catching of the connecting-pin 43 on the strut 23 and/or the tongue 33 of the retaining member 30.

Next, the brake cable connecting method will be explained based on FIGS. 6-9.

Figure 6:
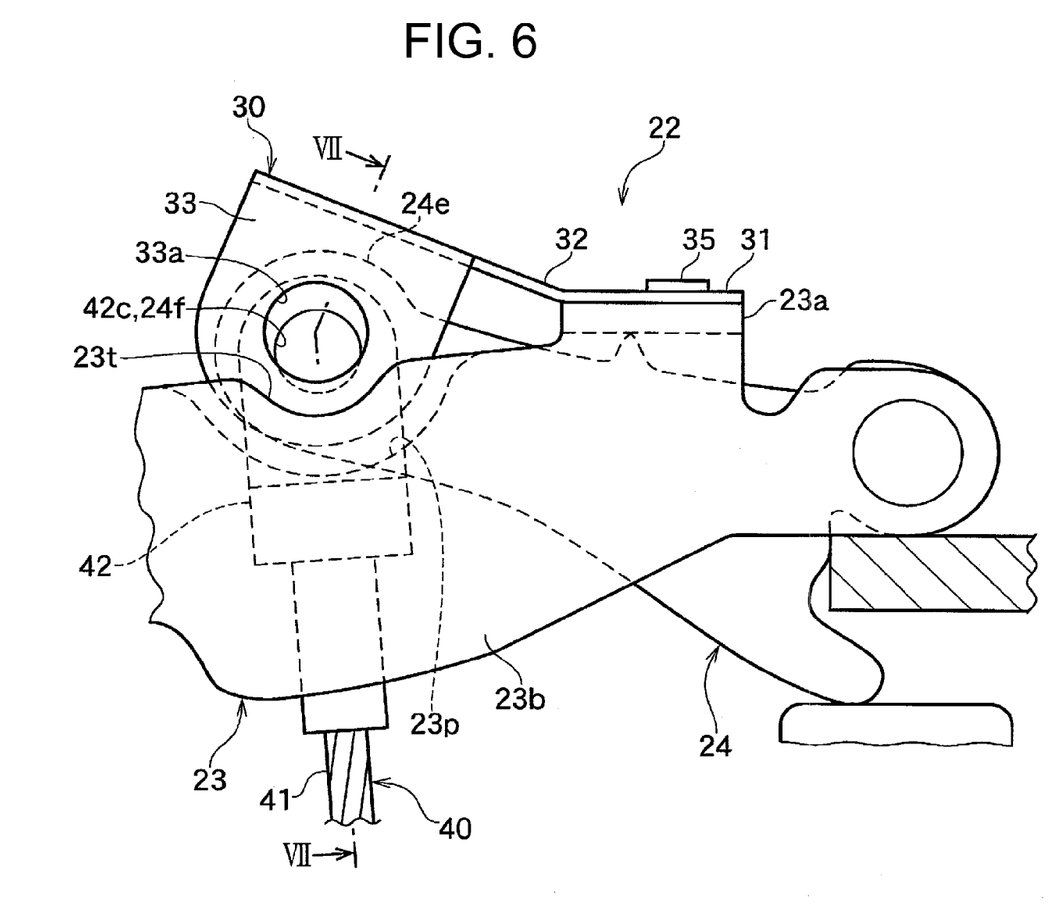
FIG. 6 is a view illustrating the first step of the brake cable connecting operation for the mechanical type brake actuator and is an enlarged view where the by-pass hole of the retaining member does not align with the connecting-holes of the cable end and the brake lever.
Figure 7:
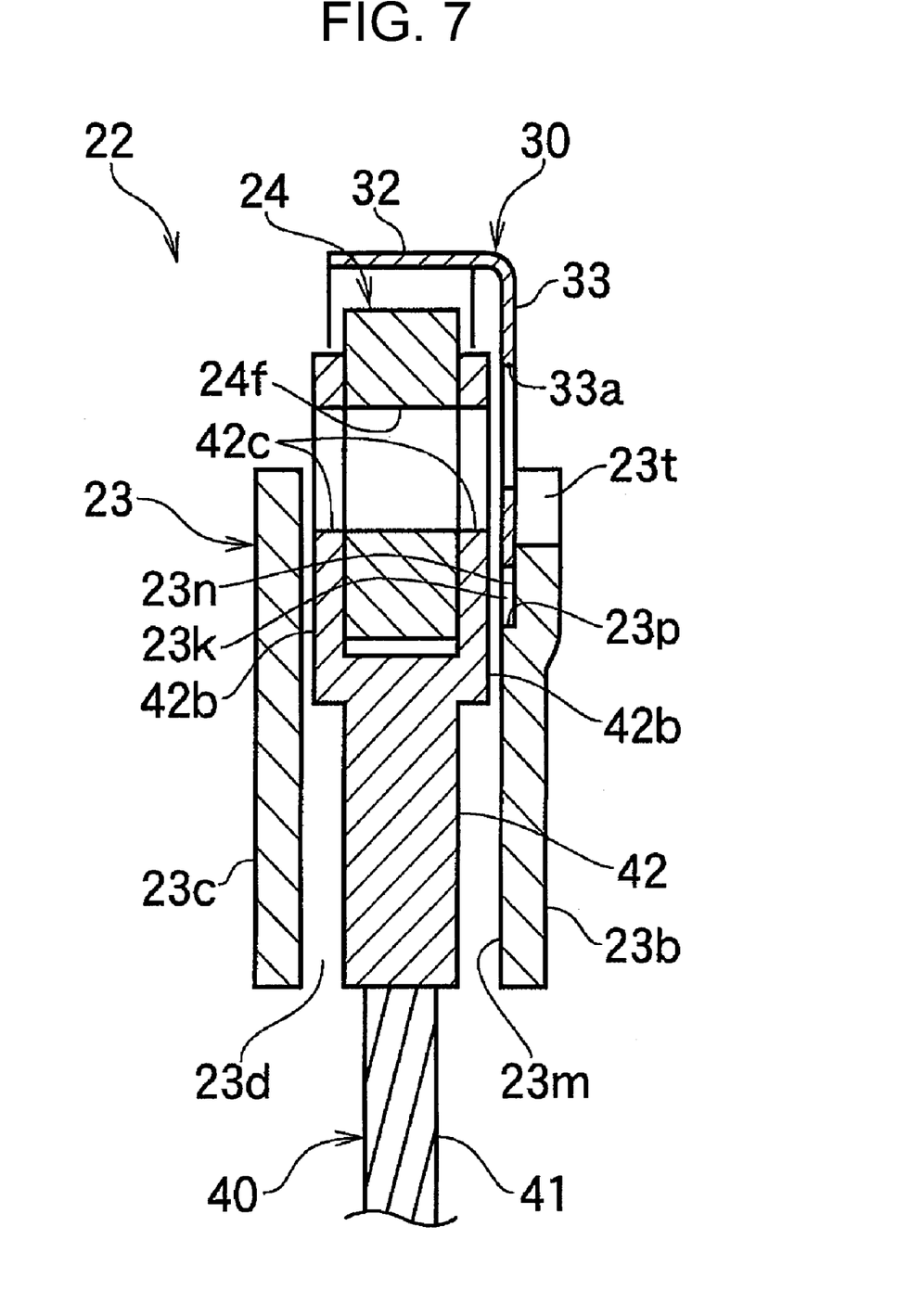
FIG. 7 is a cross section view of FIG. 6 taken along the line VII-VII.

FIGS. 6-7 illustrate the first step of connecting the brake cable 40 of the mechanical actuating mechanism 22 with the brake lever 24, where the brake lever 24 rotates in the cable releasing direction until it abuts against the bridge 23a of the strut 23, and the free end 24e of the brake lever 24 is positioned between both ears 42b and 42b and the cable end 42 of the brake cable 40 is inserted in the drum brake so as to align the connecting-hole 42c with the connecting-hole 24f. Under this condition, the retaining member 30 is fixed to the bridge 23a of the strut 23 and is freely movable, and the by-pass hole 33a of the tongue 33 is moved (up in FIGS. 6 and 7) to the cable releasing side relative to the connecting-holes 42c, 24f, and 42c of the cable end 42 and the brake lever 24.

Figure 8:
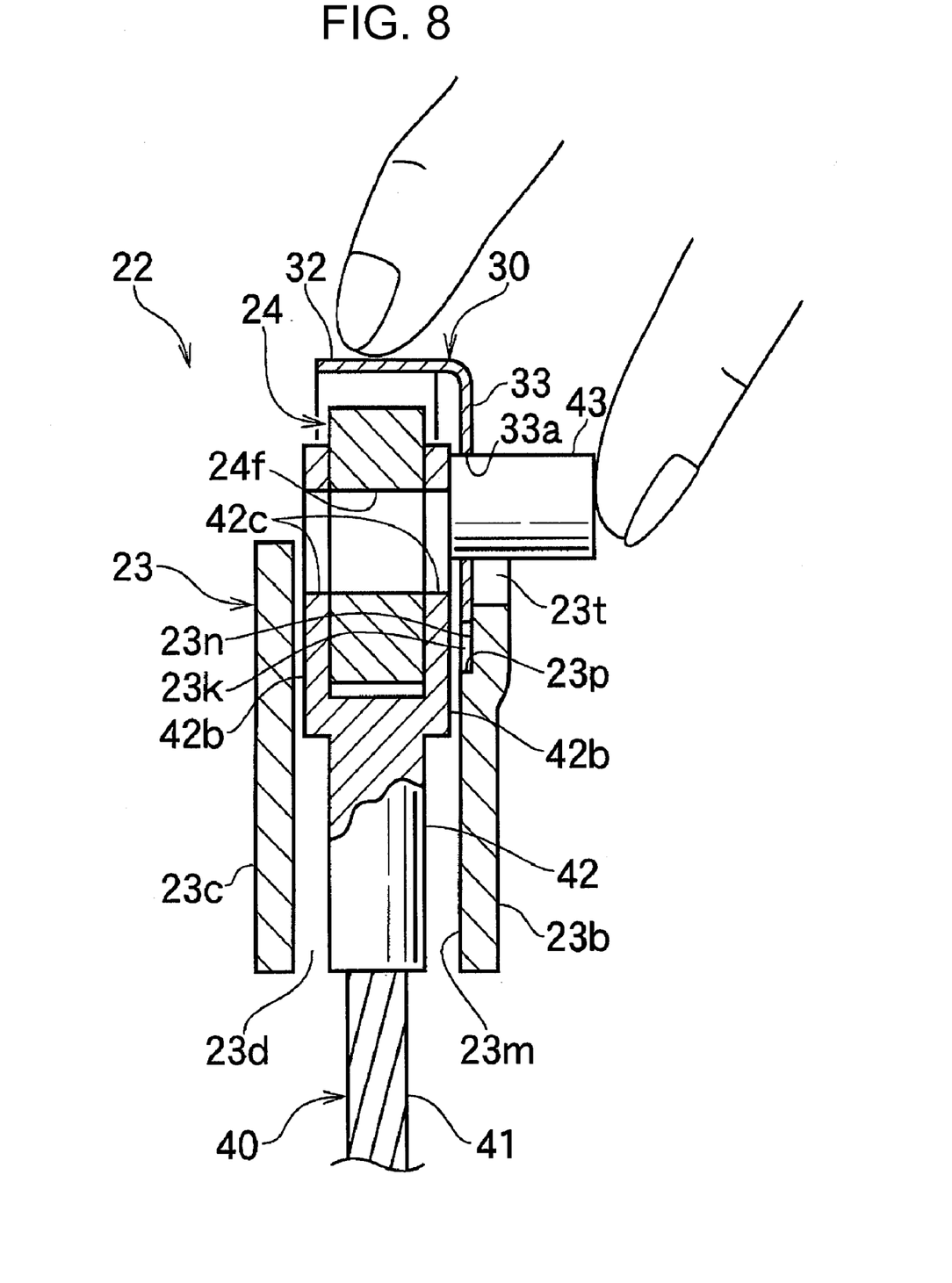
FIG. 8 is a view illustrating the second step of the brake cable connecting operation for the mechanical type brake actuator and is an enlarged view where the connecting-pin is temporarily installed in the by-pass hole of the retaining member.

FIG. 8 illustrates the second step of connecting the brake cable 40 and the brake lever 24 of the mechanical actuating mechanism 22. When inserting the connecting-pin 43 into the by-pass hole 33a, the connecting-pin 43 abuts against one leg 42b of the cable end 42, and any further movement thereof is restricted.

Figure 9:
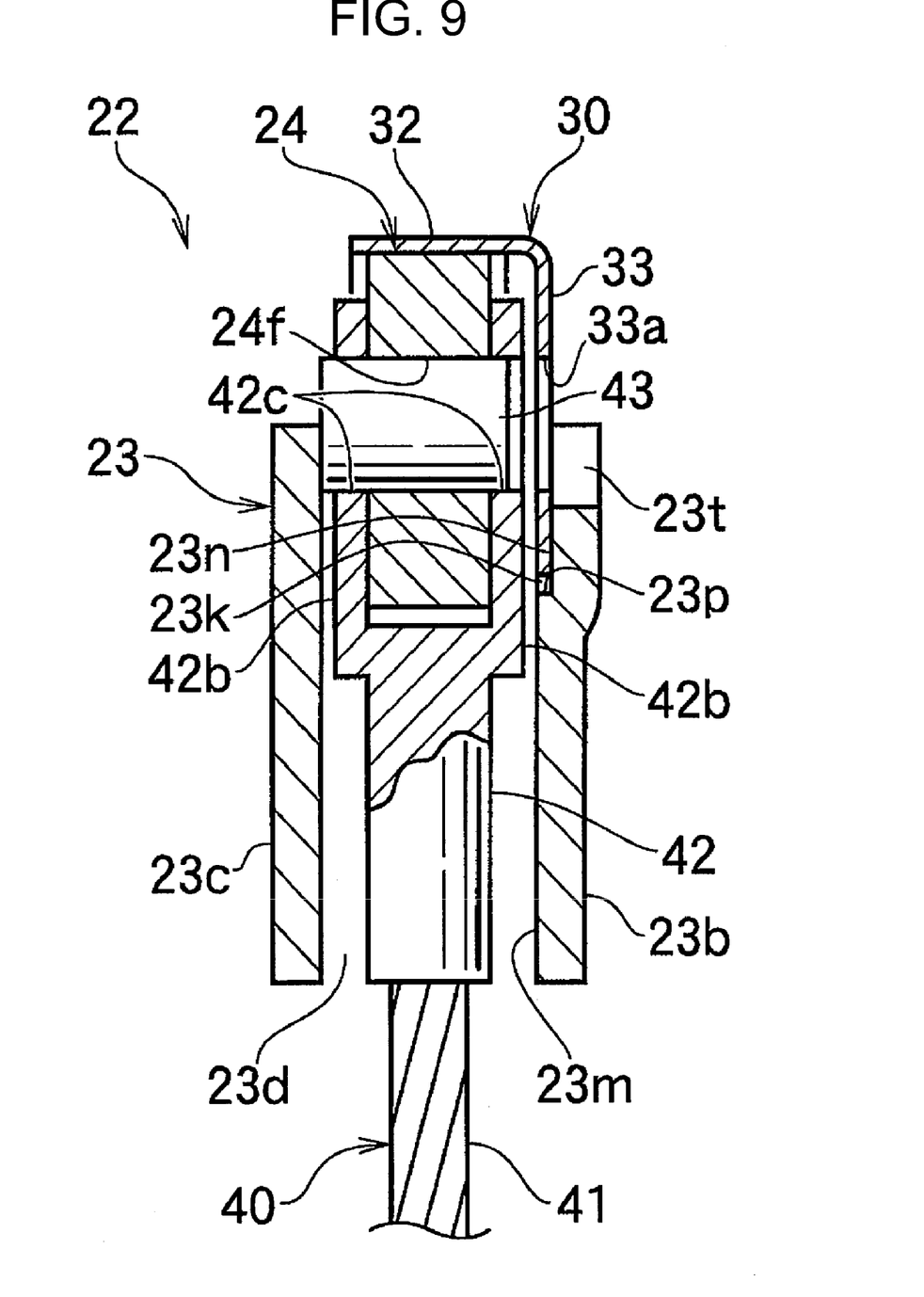
FIG. 9 is a view illustrating the third step of the brake cable connecting operation for the mechanical type brake actuator and is an enlarged view where the retaining member is resiliently deformed and the connecting-pin is inserted into the connecting-holes of the cable end and the brake lever.

FIG. 9 illustrates the third step of connecting the brake cable 40 and the brake lever 24 of the mechanical actuating mechanism 22. As pressing the connecting-pin 43, when the retaining member 30 is resiliently deformed to abut against the brake lever 24, the connecting-holes 42c, 24f, and 42c of the connecting-pin 43, the cable end 42, and the brake lever 24 are aligned to move the connecting-pin 43 until abutting against the second facing plate 23c of the strut 23.

Figure 10:
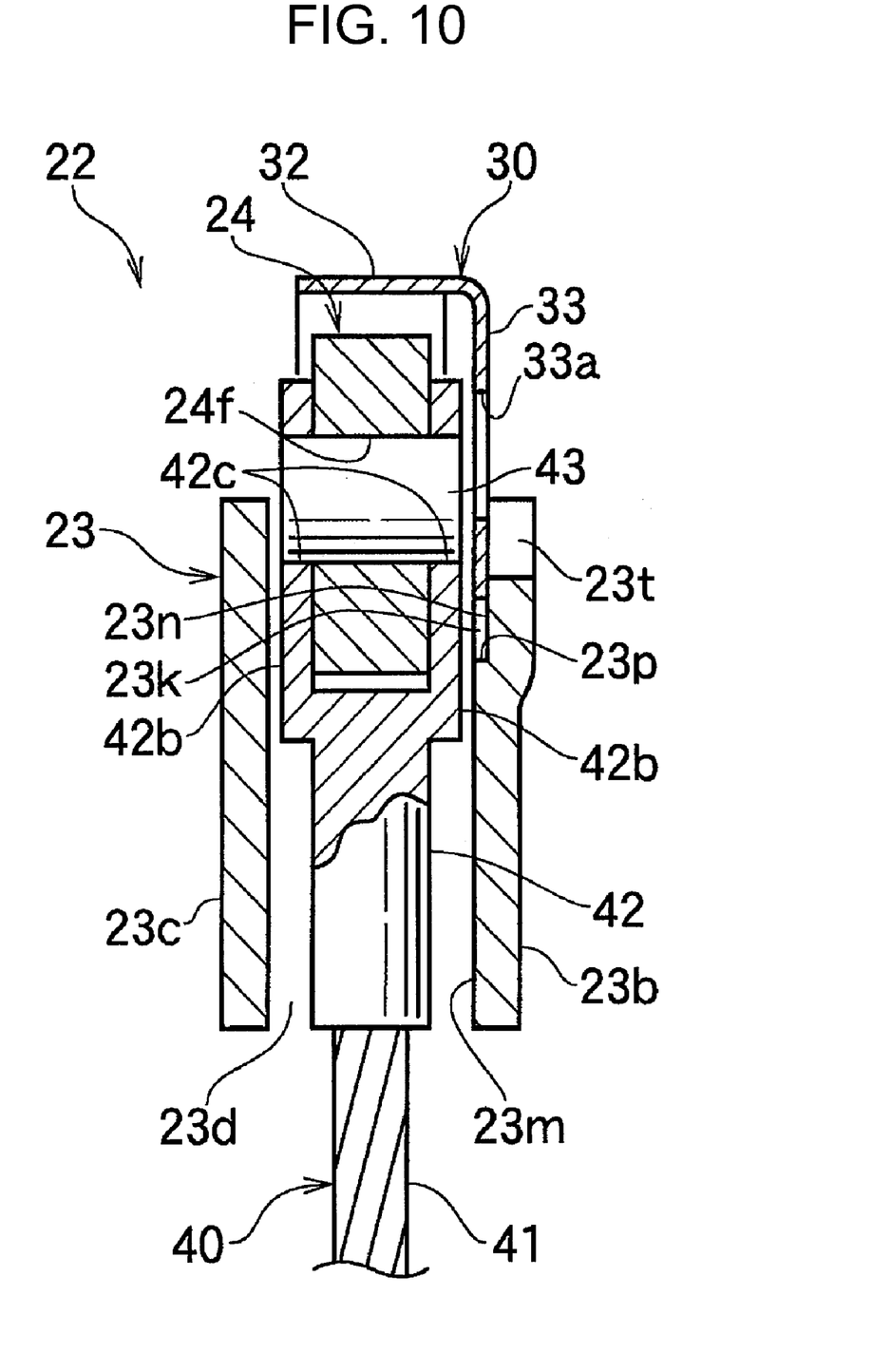
FIG. 10 is a view illustrating the fourth step of the brake cable connecting operation for the mechanical type brake actuator and is an enlarged view where the retaining member is released its resilient deformation.

FIG. 10 illustrates the fourth step of connecting the brake cable 40 and the brake lever 24 of the mechanical actuating mechanism 22. By removing the pressure on the retaining member 30 to release the resilient deformation, the tongue 33 springs back to the original position by the resilient restoring force, and the part of the tongue 33 restricts the movement of the connecting-pin 43. As a result, the connecting-pin 43 is restricted in its movement in both directions between the second facing plate 23c of the strut 23 and the tongue 33 of the retaining member 30.

Ultimately, a casing cap 44a of an outer casing 44 is affixed on the other end of a guide pipe 45 with a stopper ring 46, thereby completing the connection between the cable end 42 and the brake lever 24.

In the first embodiment, a process of connection between the brake lever 24 and the cable end 42 can be accomplished simply by temporarily connecting the connecting-pin 43 with the retaining member 30 and pressing the spring strip 32 of the retaining member 30 down while pressing the connecting-pin 43 in. In other words, a simple operation of combining the deformation process of the retaining member 30 and the insertion process of the connecting-pin 43 is sufficient to accomplish the cable connection operation; and, the operation time can be reduced because completing the cable connection does not require visual position adjustment of the connecting-holes of the brake lever and cable end. In addition, the resilient restoring force of the spring strip 32 of the retaining member 30 springs the tongue 33 back to the original position, and therefore no additional manual labor by the operator is necessary and thus, operational error is completely avoided.

The brake cable connecting method is not limited to what was described above, and for example, the following method can be used to connect the brake cable to the brake lever. This process will be explained with reference to FIG. 11. This embodiment illustrates a case when no temporal installation of the connecting-pin 43 to retaining member 30 of the first embodiment.

Figure 11:
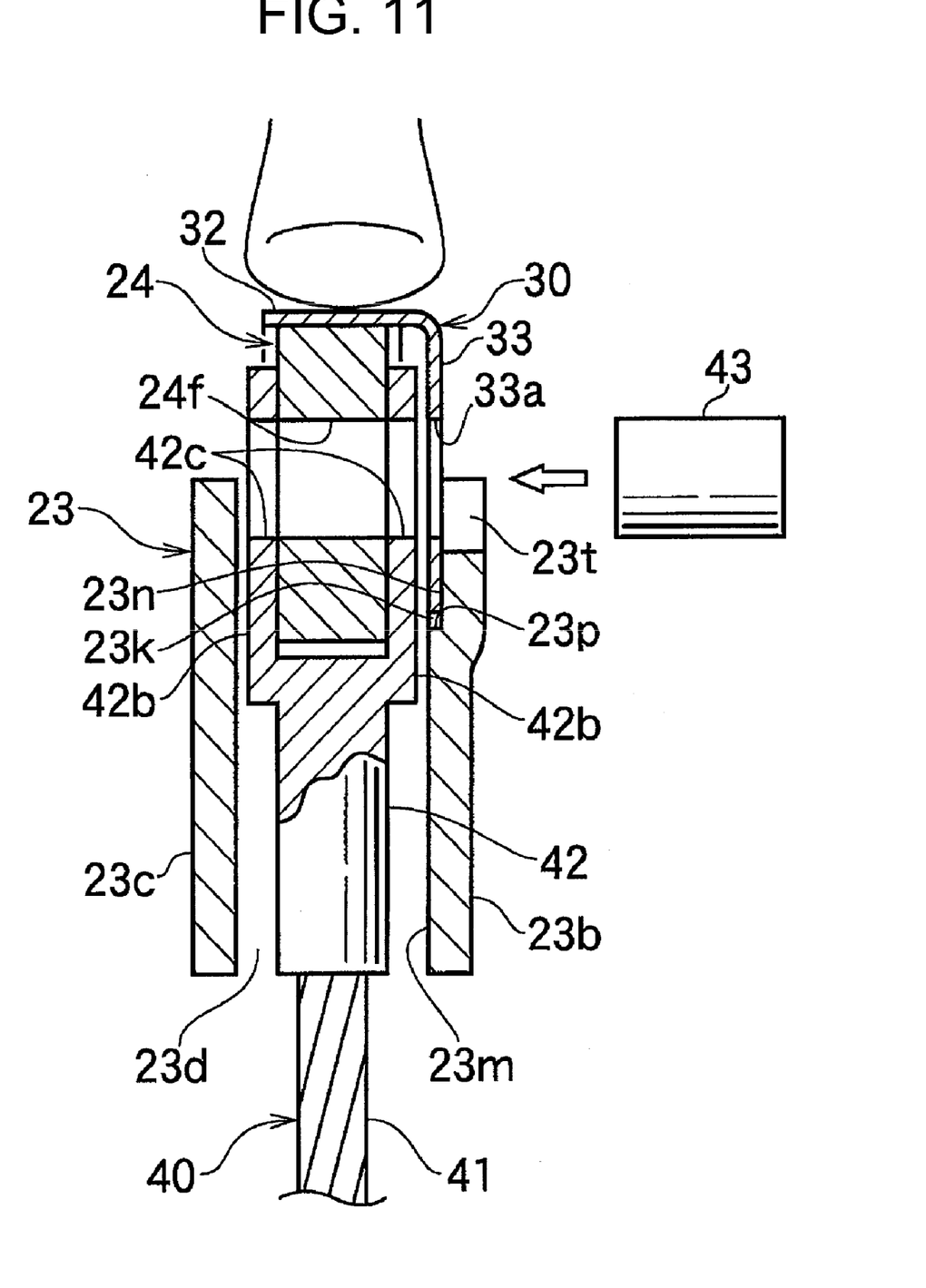
FIG. 11 is a view illustrating another cable connecting method.

After the first step of the cable installation process of the first embodiment, in this embodiment, the retaining member 30 is pressed down to resiliently be deformed, and the by-pass hole 33a is moved to align the connecting-holes 42c and 24f of the cable end 42 and the brake lever 24 respectively. Next, the connecting-pin 43 is inserted through the by-pass hole 33a, the connecting-hole 42c, the connecting-hole 24f, and the connecting-hole 42c, in this order, and then abuts against the second facing plate 23c of the strut 23. Ultimately, the process after the fourth step of the first embodiment is initiated to complete the cable connection.

Another embodiment will be explained next; however, in the explanation, identical members have the same reference numbers and the detailed explanation thereof will be omitted.

Embodiment 2

This is an embodiment having a symmetrical strut structure in consideration of the first embodiment and having a pair of tongues in the retaining member. The second embodiment will be explained with reference to FIG. 12.

Figure 12:
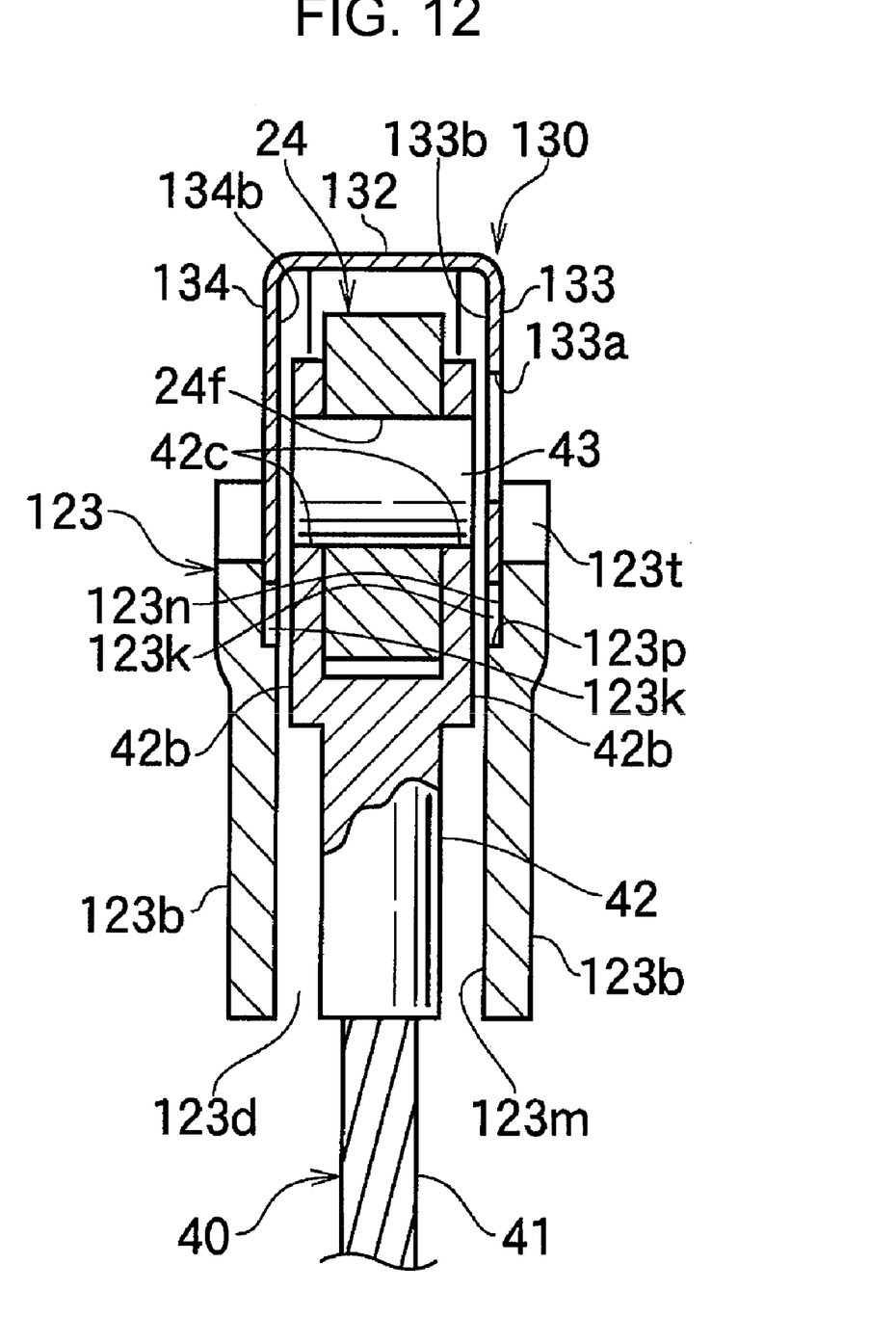
FIG. 12 is a cross section view of the mechanical type brake actuator according to the second embodiment.

A strut 123 has a pair of symmetrical facing plates 123b and 123b, each has a stepped space 123k comprised of a first surface (upper step) 123*m*, a second surface (lower step) 123*n*, and a stepped portion 123*p*.

A retaining member 130 is one piece of thin flat spring steel plate having a flat portion bent in almost a T shape and has a proximal portion 131 to be fixed to a bridge 23*a* of a strut 23; a spring strip 132 in a strip shape extending in a direction from the proximal portion 131; and a pair of tongues 133 and 134 made by bending both sides of the spring strip 132 in right angle, and only one tongue 133 has a by-pass hole 133*a*. The pair of tongues 133 and 134, while in a free state, are in about a C shape.

A brake cable connecting method will be explained with reference to FIG. 12.

First, the same operations as described in the first and second steps of the first embodiment are conducted.

Next, as pressing the connecting-pin 43 down, as the retaining member 130 is resiliently deformed to abut against the brake lever 24, the connecting-pin 43, the connecting-holes 42*c*, 42*c* of the cable end 42 and the connecting-hole 24*f* of the brake lever 24 are aligned to move the connecting-pin 43 until abutting against the other tongue 134. Ultimately, the process after the fourth step of the first embodiment is initiated to complete the cable connection.

In the second embodiment, in addition to the advantages described in the first embodiment, the struts 23, 23 in both right and left brakes can be communized. Also, the approximately C shaped pair of tongues 133 and 134 resiliently contact toward the respective second surfaces 123*n*, 123*n* of the facing plates 123*b*, 123*b* of the strut 123, and therefore back surfaces 133*b*, 134*b* of the pair of tongues 133 and 134 can be more precisely leveled with first surfaces 123*m*, 123*m* of the pair of facing plates 123*b* and 123*b* of the strut 123.

In the above-described embodiments, in order to expose the entire connecting-hole 24*f* of the brake lever 24 out from one facing plate 23*b* of the strut 23, the brake lever 24 abuts against the bridge 23*a* of the strut 23 and the abutment is maintained by pressing the brake cable 40; however, a resilient member listed in the Japanese Provisional Patent publication No. 2004-108458.

Also, in the above-described embodiments, the resilient deformation of the retaining member 30 is restricted by abutting against the brake lever 24; however, a lower end of the tongue 33 can abut against the stepped portion 23*p* of the stepped space 23*k*.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein

I claim:

1. A mechanical type brake actuator, comprising:
   (a) a strut to engage with one brake shoe, said strut having a pair of facing plates and a bridge connecting said facing plates; and
   (b) a plate-like brake lever to engage with an other brake shoe and retained in a space between said facing plates of said strut, said brake lever having a proximal portion pivotally supported by said strut,
   said brake lever and strut rotate relative to each other to spread apart from each other when a brake cable is pulled, said brake cable is connected to a free end of said brake lever via a connecting-pin, characterized in that said mechanical type brake actuator further comprises a retaining member having a tongue with an by-pass hole through which the connecting-pin penetrates and being resiliently deformable toward the free end of said brake lever,
   only when rotating said brake lever in a cable releasing direction and resiliently deforming the retaining member toward the free end of said brake lever, said connecting-pin is capable of penetrating the by-pass hole of said retaining member to connect said brake cable and the free end of said brake lever, and
   said connecting-pin movement is restricted after releasing said resilient deformation of said retaining member after connecting said brake cable and said brake lever.

2. The mechanical type brake actuator according to claim 1, characterized in that
   while restricting a cable releasing directional rotation of said brake lever as abutting against said strut, when restricting the resilient deformation of said retaining member as abutting against said brake lever,
   the connecting-pin is capable of penetrating said by-pass hole of said retaining member so as to allow a connection between the brake cable and the free end of the brake lever.

3. The mechanical type brake actuator according to claim 1, characterized in that
   said strut is configured such that said facing plate at a brake lever side has a first stepped surface or an upper stepped surface which is near said brake lever and a second stepped surface or a lower stepped surface which is formed from said first stepped surface and away from said brake lever and,
   said tongue of the retaining member moves on the second stepped surface and at the same time a brake lever side surface of the tongue is arranged to be in the same level with said first stepped surface of the strut, and
   a distance between a stepped portion at a border of said first stepped surface and said second stepped surface of the strut and an edge portion of said tongue of the retaining member facing said stepped portion is smaller than a diameter of the connecting-pin.

4. The mechanical type brake actuator according to claim 1, characterized in that
   said proximal end of the cable end is movable as abutting against a cable operation direction side of the free end of the brake lever, and
   during the movement, the connecting-pin is connectable to the cable end and the free end of the brake lever.

5. The mechanical type brake actuator according to claim 2, characterized in that
   said proximal end of the cable end is movable as abutting against a cable operation direction side of the free end of the brake lever, and
   during the movement, the connecting-pin is connectable to the cable end and the free end of the brake lever.

6. The mechanical type brake actuator according to claim 3, characterized in that
   said proximal end of the cable end is movable as abutting against a cable operation direction side of the free end of the brake lever, and
   during the movement, the connecting-pin is connectable to the cable end and the free end of the brake lever.

* * * * *